(No Model.)
W. MANEY.
WIRE TWISTING AND CUTTING IMPLEMENT.
No. 494,429. Patented Mar. 28, 1893.
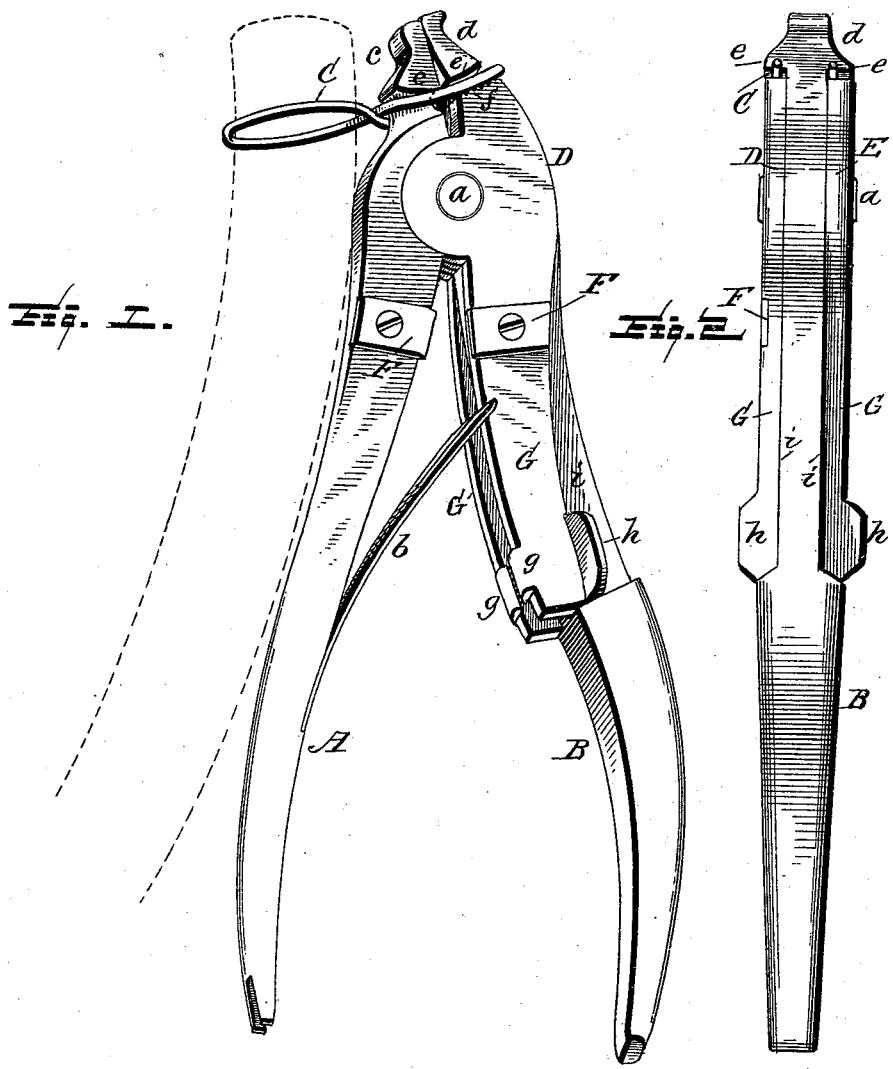
Witnesses
L. C. Hills
R. J. Roberts
Inventor
William Maney
per Chas. H. Fowler
Attorney

UNITED STATES PATENT OFFICE.

WILLIAM MANEY, OF PIQUA, OHIO.

WIRE TWISTING AND CUTTING IMPLEMENT.

SPECIFICATION forming part of Letters Patent No. 494,429, dated March 28, 1893.

Application filed November 26 1892. Serial No. 453,205. (No model.)

*To all whom it may concern:*

Be it known that I, WILLIAM MANEY, a citizen of the United States, residing at Piqua, in the county of Miami and State of Ohio, have invented certain new and useful Improvements in Wire Twisting and Cutting Implements; and I do hereby declare that the following is a full, clear, and exact description of the same, reference being had to the annexed drawings, making a part of this specification, and to the letters of reference marked thereon.

The present invention has for its object to provide a simple and effective implement for twisting and securing wire loops or rings around the ends of hose or other places where similar wire fastenings would be required, and the invention consists in an implement constructed substantially as shown in the drawings and hereinafter described and claimed.

Figure 1 of the drawings represents a perspective view of the implement showing the hose in dotted lines and the wire in position on the hose and implement previous to the wire being twisted; Fig. 2 an edge view of the implement.

In the accompanying drawings A B represent the handles of the implement which are suitably pivoted together as shown at $a$ and between the handles is a suitable spring $b$ to bring the handles back to their normal position after being compressed. The handles A B forward of the pivot $a$ terminate in jaws $c$ $d$ respectively, which have shoulders $e$ at their rear ends against which the ends of the wire C are brought in contact, as shown in Fig. 1. The handle B has pivoted to its sides by the same pivot as pivots the handles together, suitable pinchers D E which pinchers have rearwardly extending arms G which are located in mortises or the reduced portions upon the sides of the handles B, as shown at $i$. The pinchers have serrated jaws $f$ to hold the ends of the wire against the shoulders $e$ of the jaws $c$ $d$ and prevent them from slipping. The pinchers D E have stops $g$ upon their inner side which come against the edge of the handle B so that the spring $b$ will not force the pinchers beyond the handle after pressure is removed from the thumb-plates $h$.

In using the implement, the wire is first looped around the hose or other object and the ends placed in position against the shoulders of the jaws $c$ $d$, the pinchers being first pressed inwardly to allow the ends of the wire to be placed between the serrated jaws and the shoulders of the jaw $d$. In this position the jaws of the pinchers will firmly grip the wire as the action of the spring $b$ forces the lower portion of the pinchers outward and the jaws inward against the wire to hold it firmly in position. The handles of the implement are now grasped by the hand and compressed which will force out the jaws thereof and draw the loop tightly around the hose or other object and by turning the implement in the proper direction the necessary twist is given to the wire and after the implement is disconnected from the wire the ends thereof may be cut off by the cutters F which are suitably connected to one of the handles and the pinchers as shown.

Having now fully described my invention, what I claim as new, and desire to secure by Letters Patent, is—

In an implement, suitable handles pivoted together and having jaws with shoulders upon their sides, one of said handles having mortises or reduced portions upon its sides, in combination with the pinchers connected to the handles by the same pivot which joins the handles together, said pinchers having rearwardly extending arms located within the mortises or reduced portions of the handle, and provided at their ends with thumb-plates and stops, cutters upon one of the arms and handles respectively, and a spring between the handles and bearing against the arms of the pinchers, substantially as and for the purpose set forth.

In testimony that I claim the above I have hereunto subscribed my name in the presence of two witnesses.

WILLIAM MANEY.

Witnesses:
   WALTER O. MAY,
   W. W. V. BUCHANAN.